US011748370B2

(12) United States Patent
Itzkovich

(10) Patent No.: US 11,748,370 B2
(45) Date of Patent: Sep. 5, 2023

(54) METHOD AND SYSTEM FOR NORMALIZING AUTOMOTIVE DATA

(71) Applicant: OTONOMO TECHNOLOGIES LTD., Even Yehuda (IL)

(72) Inventor: Yosef Haim Itzkovich, Raanana (IL)

(73) Assignee: OTONOMO TECHNOLOGIES LTD., Herzeliya (IL)

( * ) Notice: Subject to any disclaimer, the term of this patent is extended or adjusted under 35 U.S.C. 154(b) by 0 days.

(21) Appl. No.: 17/187,878

(22) Filed: Feb. 28, 2021

(65) Prior Publication Data
US 2021/0182308 A1  Jun. 17, 2021

Related U.S. Application Data

(63) Continuation-in-part of application No. 16/305,423, filed as application No. PCT/IL2017/050602 on May 29, 2017, now abandoned.

(60) Provisional application No. 62/343,876, filed on Jun. 1, 2016.

(51) Int. Cl.
| | | |
|---|---|---|
| *G06F 16/25* | (2019.01) | |
| *G06N 20/00* | (2019.01) | |
| *H04W 4/44* | (2018.01) | |
| *H04W 4/46* | (2018.01) | |
| *H04W 4/48* | (2018.01) | |

(52) U.S. Cl.
CPC ......... *G06F 16/258* (2019.01); *G06N 20/00* (2019.01); *H04W 4/44* (2018.02); *H04W 4/46* (2018.02); *H04W 4/48* (2018.02)

(58) Field of Classification Search
CPC ..... H04W 4/40; H04W 4/46; H04W 72/0406; H04W 4/027; H04W 56/001
See application file for complete search history.

(56) References Cited

U.S. PATENT DOCUMENTS

| | | |
|---|---|---|
| 8,941,485 B1 | 1/2015 | Mendelson |
| 9,172,529 B2 | 10/2015 | Zaverucha |

(Continued)

OTHER PUBLICATIONS

International Search Report for PCT Application No. PCT/IL2017/050602, dated Oct. 5, 2017.

(Continued)

*Primary Examiner* — Khalid W Shaheed
(74) *Attorney, Agent, or Firm* — PEARL COHEN ZEDEK LATZER BARATZ LLP

(57) ABSTRACT

A method and a system for normalizing data and data format of automotive data associated with connected vehicles and obtained from a plurality of sources are provided herein. The system may include: a data collector configured to obtain a plurality of data entries relating to connected vehicles and presented in different data formats from a plurality of sources; a data manipulating platform configured to enable a user to select and order a plurality of manipulating modules configured to manipulate data or data format of the data entries; a computer processor configured to execute the manipulating modules, in the selected order on the data entries, to yield a plurality of respective data entries that are normalized in accordance with a predefined data and data format, wherein the manipulation includes in the selected order at least manipulation of the following: a data type, data name, data format, and data content.

20 Claims, 4 Drawing Sheets

(56) References Cited

U.S. PATENT DOCUMENTS

| | | | |
|---|---|---|---|
| 2002/0059201 A1 | 5/2002 | Work | |
| 2002/0099824 A1 | 7/2002 | Bender et al. | |
| 2002/0161820 A1* | 10/2002 | Pellegrino | H04L 67/10 709/201 |
| 2008/0232595 A1 | 9/2008 | Pietrowicz et al. | |
| 2011/0010563 A1 | 1/2011 | Lee et al. | |
| 2014/0040434 A1* | 2/2014 | Rybak | G07C 5/008 709/219 |
| 2014/0067800 A1* | 3/2014 | Sharma | G06Q 50/30 707/736 |
| 2014/0108787 A1 | 4/2014 | Ando et al. | |
| 2014/0195100 A1 | 7/2014 | Lundsgaard et al. | |
| 2015/0089236 A1 | 3/2015 | Han et al. | |
| 2015/0128284 A1 | 5/2015 | Lafever et al. | |
| 2015/0215274 A1 | 7/2015 | Imadali et al. | |
| 2016/0105290 A1 | 4/2016 | Khalil et al. | |
| 2017/0180289 A1* | 6/2017 | Chiappone | H04L 67/2823 |
| 2018/0254892 A1 | 9/2018 | Egorov et al. | |

OTHER PUBLICATIONS

Kung; "Secure Vehicle Communication"; Feb. 15, 2008, Retrieved from https://www.sevecom.eu/Deliverables/Sevecome_Deliverable_D2.1_v3.0.pdf.

Supplementary European Search Report for European patent application No. 17866026.5 dated Nov. 25, 2019.

Petit Jonathan et al.: "Pseudonym Schemes in Vehicular Networks: A Survey", IEEE Communications Surveys & Tutorials, vol. 17, No. 1, Aug. 7, 2014, pp. 228-255.

Naim Asaj et al.: "Towards an Identity-Based Data Model for an Automotive Privacy Process", Privacy, Security, Risk and Trust (PASSAT), 2012 International Conference on Social Computing (Socialcom), IEEE, Sep. 3, 2012, pp. 789-796.

Benin et al.: "Unified Pseudonym Distribution in VANETs", 2010 IEEE $6^{th}$ International Conference on Wireless and Mobile Computing, Networking and Communications, Niagara Falls, ON, 2010, pp. 529-533.

Pradweap R.V et al.: a Novel RSU-Aided Hybrid Architecture for Anonymous Authentication (RAHAA) in VANET. In: Bagchi A., Ray I. (eds) Information Systems Security ICISS 2013. Lecture notes in Computer Science, vol. 8303. Springer, Berlin, Heidelberg 2013.

Ylitalo et al. "Blind: A Complete Identity Protection Framework for End-points"; Conference: Security Protocols, 12th International Workshop, Cambridge, UK, Apr. 26-28, 2004. Retrieved on Dec. 20, 2021 from: https://www.researchgate.net/publication/221291195_BLIND_A_Complete_Identity_Protection_Framework_for_End-Points.

Office Action for related U.S. Appl. No. 16/305,423, dated Aug. 11, 2021.

* cited by examiner

METHOD AND SYSTEM FOR NORMALIZING AUTOMOTIVE DATA

CROSS REFERENCE TO RELATED APPLICATIONS

This application is a continuation-in-part of U.S. patent application Ser. No. 16/305,423, filed on Nov. 29, 2018, which is a US national phase of PCT International Patent Application No. PCT/IL2017/050602, filed on May 29, 2017, which claimed the benefit of U.S. Provisional Patent Application No. 62/343,876, filed Jun. 1, 2016, all of which are incorporated herein by reference in their entireties.

FIELD OF THE INVENTION

The present invention relates generally to the field of data processing, and more particularly to processing of automotive data over a computer network.

BACKGROUND OF THE INVENTION

Prior to setting forth the background of the invention, it may be helpful to provide herein definitions of certain terms that will be used hereinafter.

The term "connected vehicle" as used herein is defined as a car or any other motor vehicle such as a drone or an aerial vehicle that is equipped with any form of wireless network connectivity enabling it to provide and collect data from the wireless network. The data originated from and related to connected vehicles and their parts is referred herein to as "automotive data".

The term "data marketplace" or "data market" as used herein is defined as an online computerized platform that enables a plurality of data consumers to access and consume data. Data marketplaces typically offer various types of data for different markets and from different sources. Common types of data consumers of the automotive data marketplace may include the following domains: financial and insurance institutions, entertainment and navigation applications, safety and emergency, demography and research and many more.

Data consumed in these marketplaces may be used by businesses of all kinds, fleets, business and safety applications and many types of analysts. Data marketplaces have proliferated with the growth of big data, as the amount of data collected by municipalities and smart cities, businesses, websites and services has increased, and all that data has become increasingly recognized as an asset.

The term "data anonymization" as used herein is defined as type of information sanitization whose intent is privacy protection. It is the process of either encrypting or removing personally identifiable information from data sets, so that the people whom the data describe remain anonymous.

One major challenge for managing the date related to connected vehicles is that the data flowing from various sources comes in different formats and types and for the marketplace to operate properly it is required to make sure the data is normalized. This challenge is far from being trivial given the amount of data types, data sources and data consumers.

SUMMARY OF THE INVENTION

Some embodiments of the present invention provide a mechanism for normalizing data and data format of automotive data relating to connected vehicles and obtained from a plurality of sources. The system may include: a data collector configured to obtain a plurality of data entries relating to connected vehicles and presented in different data formats from a plurality of sources; a data manipulating platform configured to enable a user to select and order a plurality of manipulating modules configured to manipulate data or data format of the data entries; a computer processor configured to execute the manipulating modules, in the selected order on the data entries, to yield a plurality of respective data entries that are normalized in accordance with a predefined data and data format, wherein the manipulation includes in the selected order at least manipulation of the following: a data type, data name, data format, and data content.

These and other advantages of the present invention are set forth in detail in the following description.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
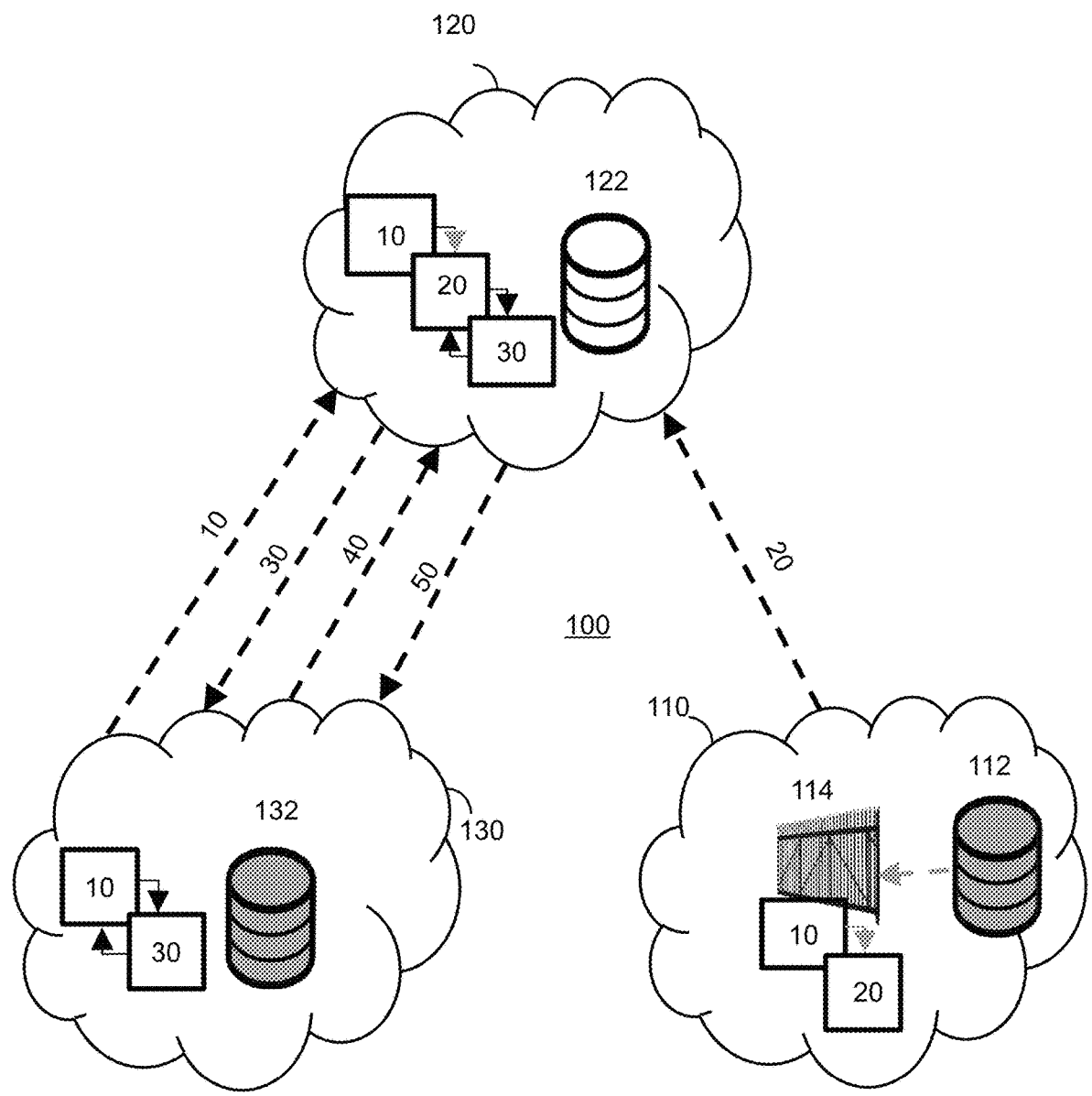
FIG. 1 is a block diagram illustrating an architecture of a computer-based system for communicating anonymized data of uniquely identified connected cars via a computer network in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to setting forth the embodiments of the present invention, it may be helpful to provide herein definitions of certain terms that will be used hereinafter.

The term "policy" as used herein is defined as sequence of operations applied to automotive data records and to the sensors composed of. In the context of data normalization, "normalization policy" may include various data manipulations applied to automotive data records that will produce normalized output usable as uniform or common data language for to support various range of use cases.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating an architecture of a computer-based system 100 in accordance with some embodiments of the present invention. A system 100 for communicating anonymized data of uniquely identified connected vehicles via a computer network, is illustrated herein. The system may include: personalized database 112 configured to maintain a plurality of unique identifiers 10 of connected vehicles associated with respective data and an anonymization module 114 located at the personalized cloud or computer system 110, configured to anonymize the unique identifiers 10 by applying a unidirectional conversion, to yield respective anonymized unique identifiers 20. Computer-based system 110 may be implemented by a computer processor.

System 100 may further include a networked server 122 on an anonymized cloud or computer system 120 configured to maintain the respective data associated with the anonymized unique identifiers 20, wherein the networked server 122 is configured to: receive a request from at least one third party client 130, for a temporary anonymized identifier 30 associated with a connected vehicle linked to a specific unique identifier 10; unidirectionally convert the specific unique identifier 10 to a respective specific anonymized unique identifier 20, using the unidirectional conversion; in a case that the anonymized unique identifier 20 exists on the server, generate a temporary anonymized identifier 30 by applying a bi-directional conversion to the specified anonymized unique identifier 20, wherein the bi-directional conversion is specific to the at least one third party 130; receive, at the networked server 122, a request 40 from the third party 130 for data associated with a connected vehicle linked to a specific temporary anonymized identifier 30; convert the specific temporary anonymized identifier 30 into a respective anonymized unique identifier 20 based on the bi-directional conversion; and provide the requested data from the networked server 122 to the third party 130 based on the specific anonymized unique identifier 20 via response 50 communicated from anonymized cloud 120 to third party cloud 130. Computer system 120 may be implemented by a computer processor.

It should be noted that any third party cloud 130 may keep the association of specific unique identifier 10 to the received temporary anonymized identifier 30 in an internal database, and vice versa.

According to some embodiments of the present invention, the providing of the data to the third party is only identifiable by the temporary anonymized identifier.

According to some embodiments of the present invention, the unique identifiers of connected vehicles associated with respective data are obtained from a plurality of sources, each holding a database of connected vehicles and their respective data.

According to some embodiments of the present invention, the temporary anonymized identifier is associated with a predefined time span after which it ceased to be operational.

According to some embodiments of the present invention, the networked database and the personalized database may be distinct from each other and may communicate over a communication channel, but they may also be collocated and only be logically separated.

According to some embodiments of the present invention, at least one third party comprises a plurality of third party clients, each associated with a unique bi-directional conversion at the networked database.

Figure 2:
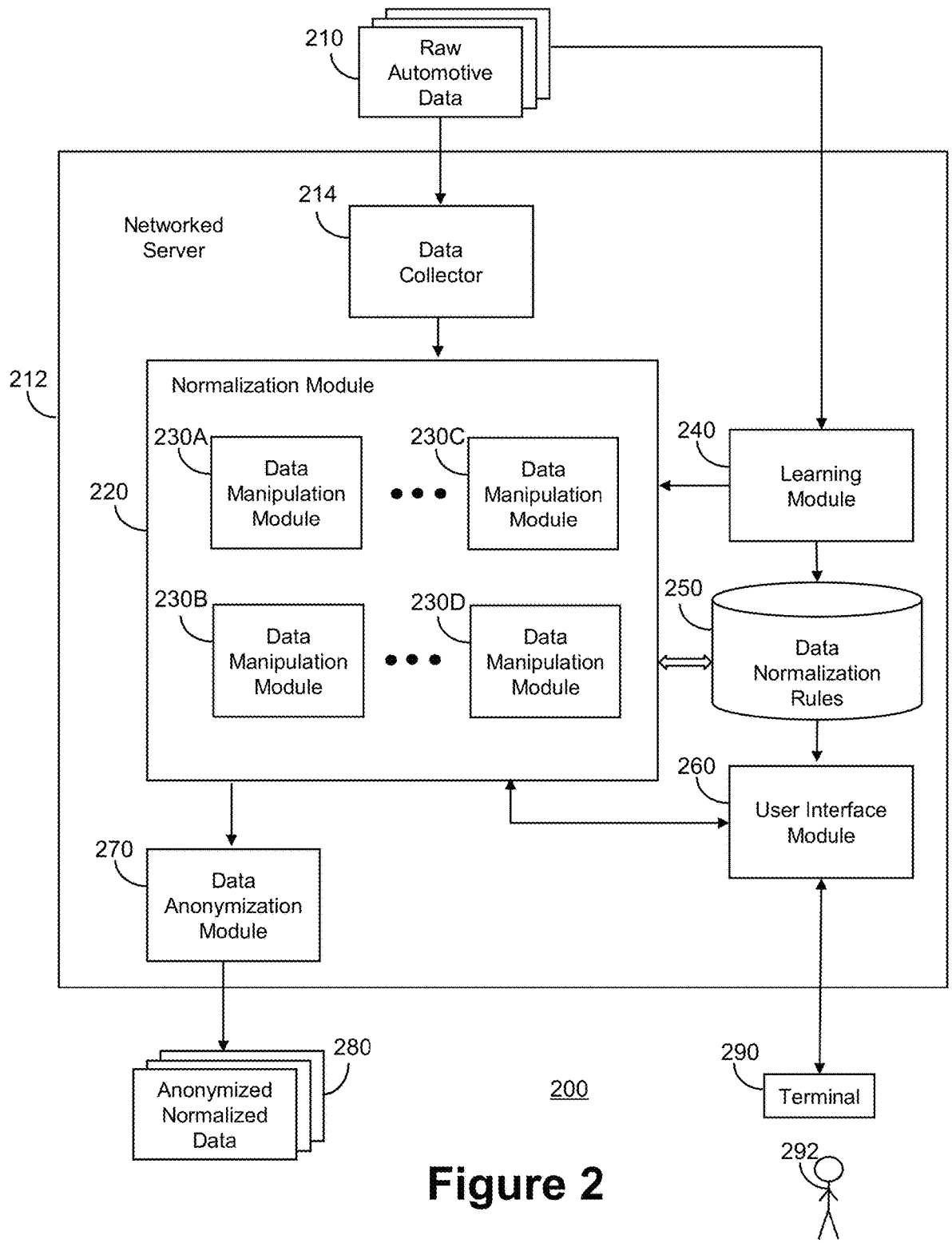
FIG. 2 is a block diagram illustrating non-limiting exemplary architecture of a data normalizing module in accordance with embodiments of the present invention.

FIG. 2 is a block diagram illustrating an architecture of a marketplace server for managing automotive data associated with connected vehicles in accordance with embodiments of the present invention. System 200 may include a networked server 212 implementing a data marketplace and connected via a network to a plurality of data sources holding raw automotive data 210.

According to some embodiments of the present invention, networked server 212 may include a data collector 214 configured to obtain a plurality of data entries relating to connected vehicles and presented in different data formats from a plurality of sources. Networked server 212 may further include a normalization module 220 which includes a plurality of data manipulating modules 230A to 230D.

According to some embodiments of the present invention, normalization module 220 may be configured to enable selection and ordering of the plurality of manipulating modules 230A to 230D, to yield selected and ordered manipulating modules.

According to some embodiments of the present invention, normalization module 220 may be configured to execute the selected and ordered manipulating modules, using a computer processor, on the data entries, to yield a plurality of respective data entries that are normalized in accordance with a predefined data format.

According to some embodiments of the present invention, manipulating modules 230A to 230D are configured to manipulate at least: a data type, data name, data format, and data content of the data entries, in accordance with normalization rules 250.

According to some embodiments of the present invention, the selection and ordering are carried out by a human user 292 over a user interface 290.

According to some embodiments of the present invention, the selection and ordering may be carried out automatically by a computer processor based on the normalization rules 250.

According to some embodiments of the present invention, networked server 212 may further include a learning module 240 configured to apply machine learning algorithms to an incoming stream of the plurality of data entries 210, to update the normalization rules 250. This may be done by classifying the various data types, formats, names, usage, origin, content and other features, so that the format diversity is learned and modeled. The model then can be used in improving the normalization rules based on the actual diversity of the date entries. The model can improve efficiency of the normalization process as carried out by selecting and ordering the plurality of data manipulation modules 230A-230D.

According to some embodiments of the present invention, the data anonymization module 270 may be configured to apply data anonymization on at least one part one attribute of the data entry rendering it unreadable. The output of the networked server is anonymized normalized data 280 which can be stored and accessed by data consumers in accordance with the mechanism as explained in FIG. 1.

Figure 3:
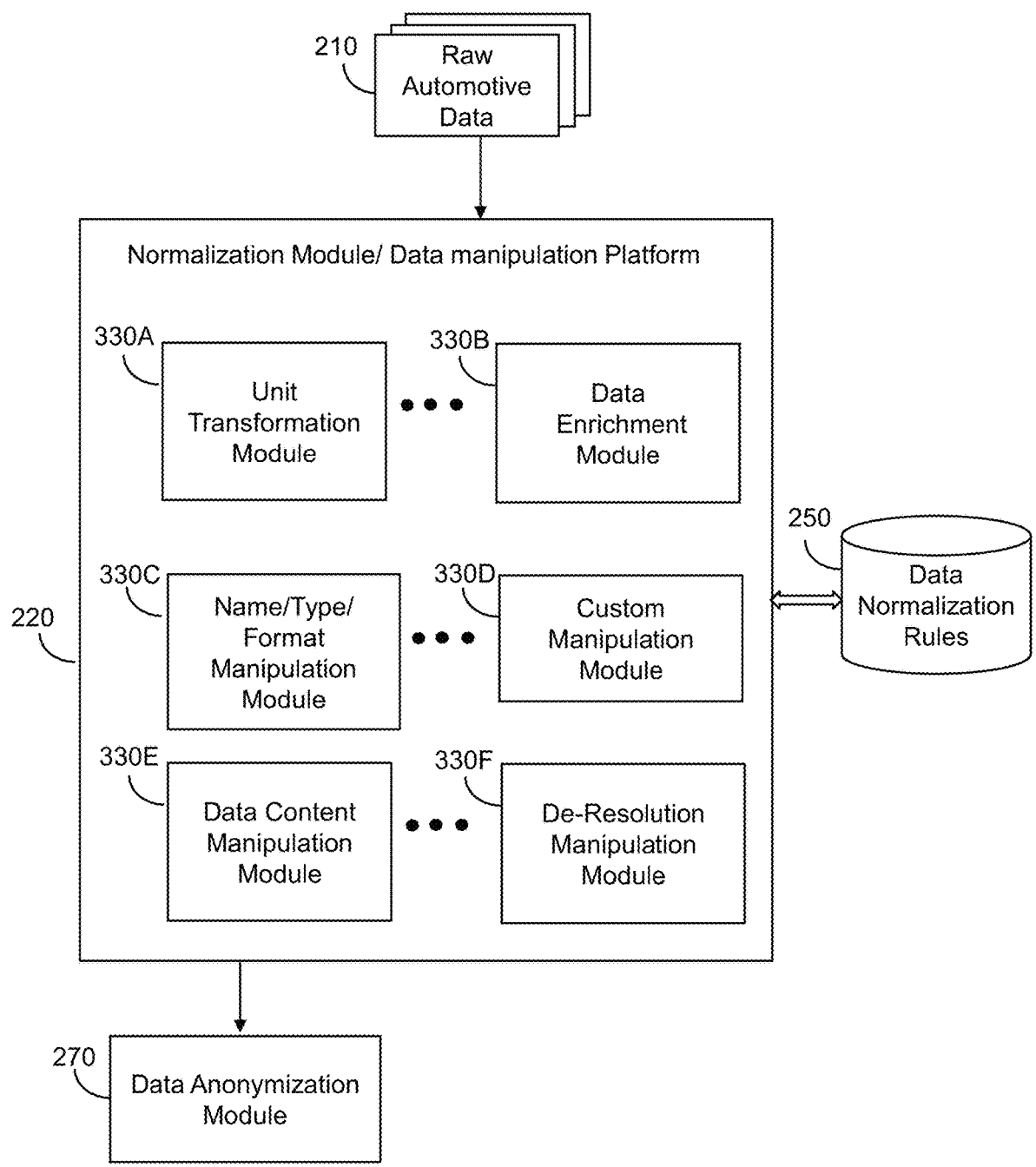
FIG. 3 is a block diagram illustrating non-limiting exemplary architecture of a data normalizing module in accordance with embodiments of the present invention.

FIG. 3 is a block diagram illustrating non-limiting exemplary architecture of a data normalizing module (or data manipulation platform) 220 in accordance with some embodiments of the present invention. Data normalizing module 220 received an influx of raw automotive data 210 which may include several data manipulation modules that may be used in a specific order and at a specific configuration over the raw automotive data 210 in accordance with data normalization rules 250 before being anonymized by data anonymization module 270.

Following below are examples for such data manipulation modules, each of which can be implemented by normalization module 220.

According to some embodiments of the present invention, the manipulating module configured to manipulate the data name, data type or data format 330C may be configured to rename an attribute of the data entry and switching to another data format or another data type, based on a policy rule compliant with the normalization rules.

According to some embodiments of the present invention, the manipulating module configured to manipulate the data type 330C may be configured to transform the data type of the data entry from a first data type to a second data type.

According to some embodiments of the present invention, the manipulating modules further comprise a unit transformation module 330A which may be configured to transform a unit type of a metric associated with the data entry from a first unit type to a second unit type.

According to some embodiments of the present invention, the manipulating modules may further include a data enrichment module 330B configured to enrich a data record of the data entry with predefined values.

According to some embodiments of the present invention, the manipulating modules further includes a custom module 330D, which may be configured to manipulate data or data format of the data entry based on user definition.

According to some embodiments of the present invention, the manipulating modules may further include a data content manipulation module 330E which may be configured to manipulate the content of a data record of the data entry.

According to some embodiments of the present invention, the manipulating modules may further include a data de-resolution module 330F which may be configured to reduce an accuracy of a data record of the data entry.

According to some embodiments of the present invention, by using learning module 250 it would be possible to apply learning techniques to sensors records in order to classify and identify the metadata and sensor types. Once the sensor type has been identified, it is possible to define a policy per type, i.e., define policy per speed, to be in km/h or blur latitude/longitude into specific resolution (e.g., three digits rounding).

By way of example, speed can be called "SPD" or "car_speed" and can be given in km/h or m/s or mile/h. Thus, once the parameter has been identified as "speed", the name of the parameters from all data providers associated with "speed" is changed accordingly to an agreed name, and the corresponding unit transformation is applied so all parameters are in the same units (e.g., km/h).

In another example, suppose there are two different time readings—GPS time, and car time. By using learning module 250, it would be possible to apply the same policy which is "convert epoch time to UTC with appropriate time zone", and then it will not be required to specify, for each time sensor, what type of unit conversion is needed.

Advantageously, the learning module enables to apply a policy on parameters from specific sensors and on a higher hierarchical level, i.e., apply a data normalization policy on the class level and not only on the sensor level, thereby shifting from so called "policy tactics" into "policy strategy".

Figure 4:
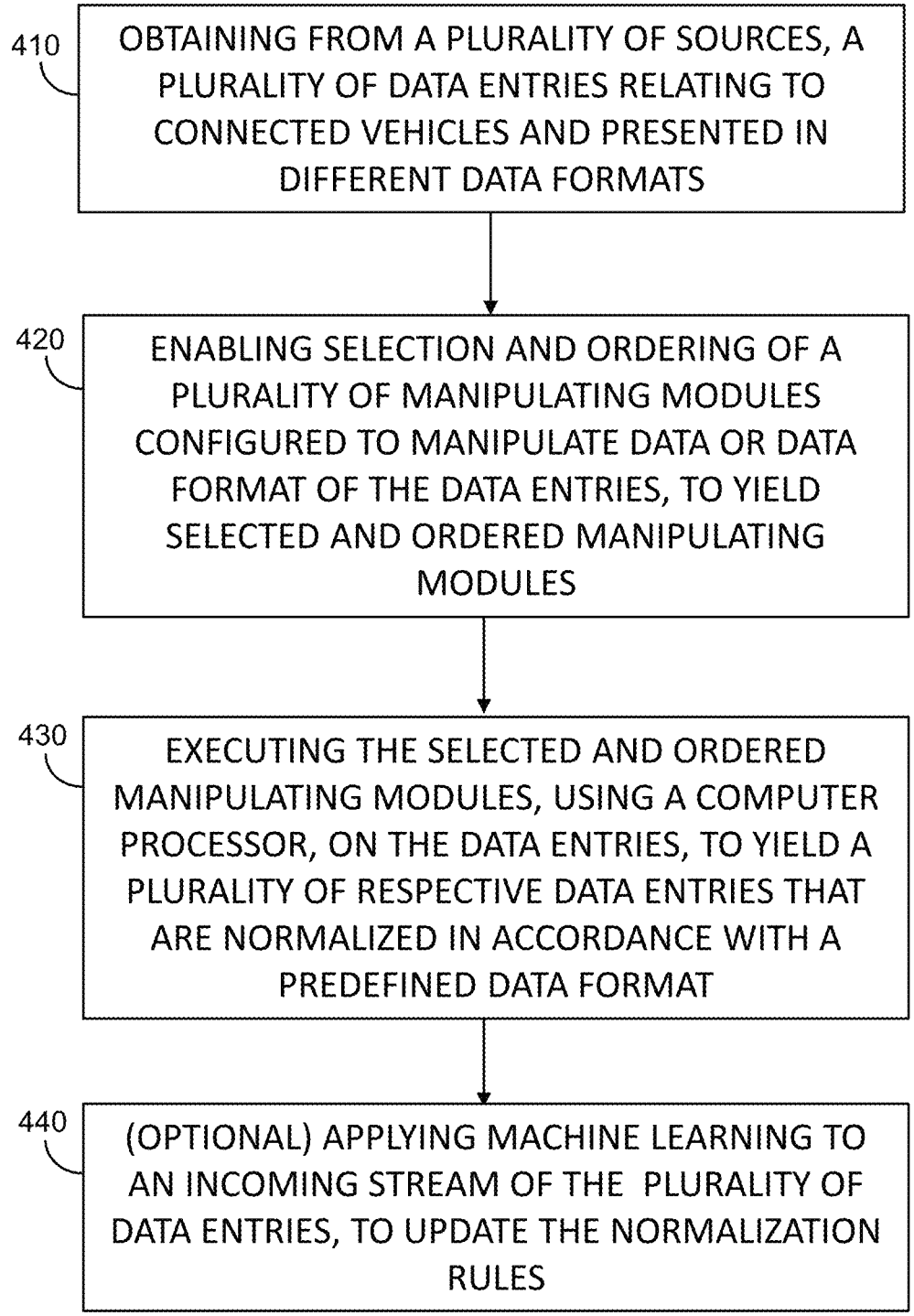
FIG. 4 is a high-level flowchart illustrating non-limiting exemplary method in accordance with embodiments of the present invention.

FIG. 4 is a high-level flowchart illustrating non-limiting exemplary method in accordance with some embodiments of the present invention. A method 400 for normalizing data and data format of data relating to connected vehicles and obtained from a plurality of sources is provided herein. Method 400 may include the following steps: obtaining from a plurality of sources, a plurality of data entries relating to connected vehicles and presented in different data formats 410; enabling selection and ordering of a plurality of manipulating modules configured to manipulate data or data format of the data entries, to yield selected and ordered manipulating modules 420; and executing the selected and ordered manipulating modules, using a computer processor, on the data entries, to yield a plurality of respective data entries that are normalized in accordance with a predefined data format 430, wherein the manipulating modules are configured to manipulate at least: a data type, data name, data format, and data content of the data entries, in accordance with normalization rules.

According to some embodiments of the present invention, the selection and ordering are carried out by a human user over a user interface.

According to some embodiments of the present invention, the selection and the ordering may be carried out automatically by a computer processor based on the normalization rules.

According to some embodiments of the present invention, method 400 may further include the step of applying machine learning to an incoming stream of the plurality of data entries, to update the normalization rules 440.

It should be noted that the method according to some embodiments of the present invention may be stored as instructions in a computer readable medium configured to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of normalizing data and data format of automotive data associated with connected vehicles and obtained from a plurality of sources, the method comprising:

obtaining from a plurality of sources, a plurality of data entries relating to connected vehicles and presented in different data formats;

enabling selection and ordering of a plurality of manipulating modules configured to manipulate data or data format of said data entries, to yield one or more selected and ordered manipulating modules;

executing the selected and ordered manipulating modules, using a computer processor, on said data entries, to yield a plurality of respective data entries that are normalized in accordance with a predefined data format;

applying machine learning algorithms to the plurality of data entries to update the normalization rules by classifying the various data types, formats, names, usage, origin, and content, so that a format diversity is learned and modeled to a model;

using the model to improve the normalization rules based on an actual diversity of the date entries, wherein the applying of the machine learning algorithms is carried out on sensors records in order to classify and identify metadata and sensor types, to identify sensor type and to define a policy per sensor type, and applying the policy to data records belonging to the same sensor type, wherein the manipulating modules are software modules comprising instructions in a computer readable medium configured to cause the computer processor to manipulate: a data type, data name, data format, and data content of the data entries, in accordance with normalization rules, and wherein the plurality of respective data entries that are normalized in accordance with the predefined data format are used as uniform or common data language to support a plurality of use cases for automotive data consumer software applications.

2. The method according to claim 1, wherein the selection and ordering are carried out by a human user over a user interface.

3. The method according to claim 1, wherein the selection and ordering are carried out automatically by a computer processor based on the normalization rules.

4. The method according to claim 1, further comprising applying machine learning to an incoming stream of the plurality of data entries, to update the normalization rules.

5. The method according to claim 1, wherein the plurality of manipulating modules comprises a name manipulating module configured to rename an attribute of the data entry, based on a policy rule compliant with the normalization rules.

6. The method according to claim 1, wherein the plurality of manipulating modules comprises a data type manipulation module configured to change the data type of the data entry from a first data type to a second data type.

7. The method according to claim 1, wherein the plurality of manipulating modules further comprises a unit transformation module configured to transform a unit type of a metric associated with the data entry from a first unit type to a second unit type.

8. The method according to claim 1, wherein the plurality of manipulating modules further comprises a custom module, configured to manipulate data or data format of the data entry based on user definition.

9. The method according to claim 1, wherein the plurality of manipulating modules further comprises a data enrichment module configured to enrich a data record of the data entry with predefined values.

10. The method according to claim 1, wherein the plurality of manipulating modules further comprises a data de-resolution module configured to reduce an accuracy of a data record of the data entry.

11. The method according to claim 1, further comprising applying data anonymization on at least one part of an attribute of the data entry rendering it unreadable, after the executing of the selected and ordered manipulating modules.

12. The method according to claim 1, wherein the manipulating of the data entries in accordance with the normalization rules is carried out by executing similar selected and ordered manipulating modules for data entries from similar data sources or from similar sensors.

13. A system for normalizing data and data format of automotive data associated with connected vehicles and obtained from a plurality of sources, the system comprising:
   a data collector configured to obtain from a plurality of sources, a plurality of data entries relating to connected vehicles and presented in different data formats;
   a normalization module configured to:
      enable selection and ordering of a plurality of manipulating modules configured to manipulate data or data format of said data entries, to yield selected and ordered manipulating modules; and
      execute the selected and ordered plurality of manipulating modules, using a computer processor, on said data entries, to yield a plurality of respective data entries that are normalized in accordance with a predefined data format; and
   a learning module configured to:
      apply machine learning algorithms to the plurality of data entries to update the normalization rules by classifying the various data types, formats, names, usage, origin, and content, so that a format diversity is learned and modeled to a model; and
      use the model to improve the normalization rules based on an actual diversity of the date entries,
   wherein the applying of the machine learning algorithms is carried out on sensors records in order to classify and identify metadata and sensor types, to identify sensor type and to define a policy per sensor type, and applying the policy to data records belonging to the same sensor type,
   wherein the plurality of manipulating modules are software modules comprising instructions in a computer readable medium configured to cause the computer processor to manipulate: a data type, data name, data format, and data content of the data entries, in accordance with normalization rules, and
   wherein the plurality of respective data entries that are normalized in accordance with the predefined data format are used as uniform or common data language to support a plurality of use cases for automotive data consumer software applications.

14. The system according to claim 13, wherein the selection and ordering are carried out by a human user over a user interface.

15. The system according to claim 13, wherein the selection and ordering are carried out automatically by a computer processor based on the normalization rules.

16. The system according to claim 13, further comprising a learning module configured to apply machine learning to an incoming stream of the plurality of data entries, to update the normalization rules.

17. The system according to claim 13, wherein the plurality of manipulating modules comprise a name manipulation module configured to rename an attribute of the data entry, based on a policy rule compliant with the normalization rules.

18. The system according to claim 13, wherein the plurality of manipulating modules comprise a data type manipulation module configured to manipulate the data type of the data entry from a first data type to a second data type.

19. The system according to claim 13, wherein the plurality of manipulating modules further comprise a unit transformation module configured to transform a unit type of a metric associated with the data entry from a first unit type to a second unit type.

20. A non-transitory computer readable medium for normalizing data and data format of automotive data associated with connected vehicles and obtained from a plurality of sources, the non-transitory computer readable medium comprising a set of instructions that, when executed, cause at least one computer processor to:
   obtain from a plurality of sources, a plurality of data entries relating to connected vehicles and presented in different data formats;
   enable selection and ordering of a plurality of manipulating modules configured to manipulate data or data format of said data entries, to yield selected and ordered manipulating modules;
   execute the selected and ordered manipulating modules, using a computer processor, on said data entries, to yield a plurality of respective data entries that are normalized in accordance with a predefined data format;
   apply machine learning algorithms to the plurality of data entries to update the normalization rules by classifying the various data types, formats, names, usage, origin, and content, so that a format diversity is learned and modeled to a model; and
   use the model to improve the normalization rules based on an actual diversity of the date entries,
   wherein the applying of the machine learning algorithms is carried out on sensors records in order to classify and identify metadata and sensor types, to identify sensor type and to define a policy per sensor type, and applying the policy to data records belonging to the same sensor type,
   wherein the plurality of manipulating modules are software modules comprising instructions on the non-transitory computer readable medium configured to cause the computer processor to manipulate: a data type, data name, data format, and data content of the data entries, in accordance with normalization rules, and
   wherein the plurality of respective data entries that are normalized in accordance with the predefined data format are used as uniform or common data language to support a plurality of use cases for automotive data consumer software applications.

* * * * *